United States Patent [19]

Forman

[11] Patent Number: 4,613,946

[45] Date of Patent: Sep. 23, 1986

[54] METHOD AND APPARATUS FOR GENERATING HIERARCHICAL DISPLAYS

[76] Inventor: Ernest H. Forman, 1438 Ironwood Dr., McLean, Va. 22101

[21] Appl. No.: 618,148

[22] Filed: Jun. 7, 1984

[51] Int. Cl.$^4$ ............................................. G06F 15/21
[52] U.S. Cl. .................................. 364/518; 364/521; 364/300; 340/720
[58] Field of Search ...................... 364/518, 521, 300; 340/720

[56] References Cited

U.S. PATENT DOCUMENTS

| | | | |
|---|---|---|---|
| 4,177,514 | 12/1979 | Rupp ................................... | 364/200 |
| 4,303,973 | 12/1981 | Williamson, Jr. et al. .......... | 364/189 |
| 4,482,951 | 11/1984 | Swaney et al. .................. | 364/300 X |
| 4,554,631 | 11/1985 | Reddington ........................ | 364/300 |

*Primary Examiner*—Edward J. Wise
*Attorney, Agent, or Firm*—Lowe Price Leblanc Becker & Shur

[57] ABSTRACT

Method and apparatus are described for drawing tree structures on output displays and on printed output reports. The tree structures include complete illustration of nodes and branches connecting the same, and further provides display or printing of data associated with the various nodes. The central node of the tree may be arbitrarily selected by redrawing the structure to focus on the root node of the tree or on the arbitrarily selected central node. For economic use of display space, a skeletal display may be provided in which only the nodes descendent from the central node of interest are shown with the associated data, the remaining nodes being displayed in skeletal format only. The tree structure may be applied to a descision making algorithm, and may be used to provide a number of alternatives useful for attaining a desired goal, and for evaluating the various alternatives.

26 Claims, 11 Drawing Figures

PEER NODES
SOME EXAMPLES ENCLOSED IN ( - - - )

A — NEW DEV.
B — OLD/WORK
C — DN/TWN

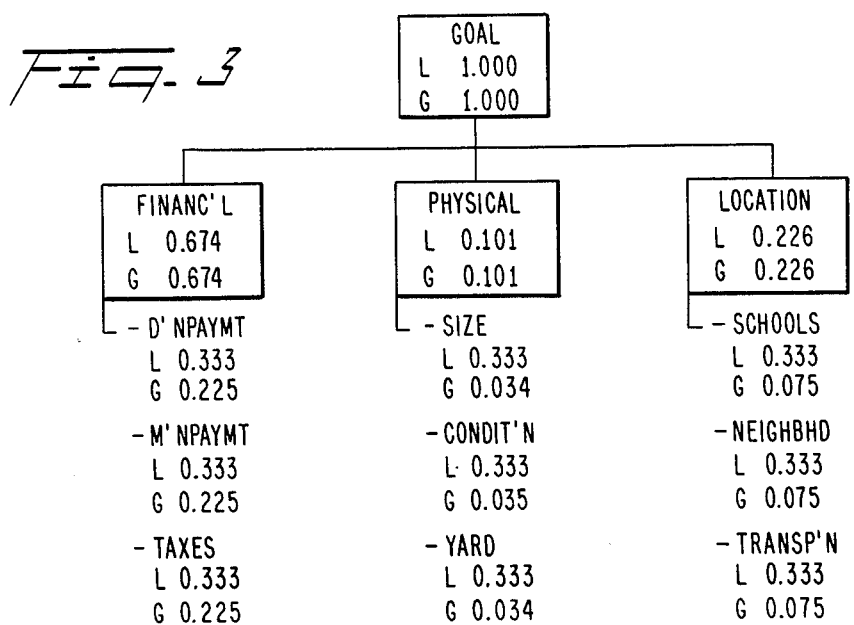
Fig. 3
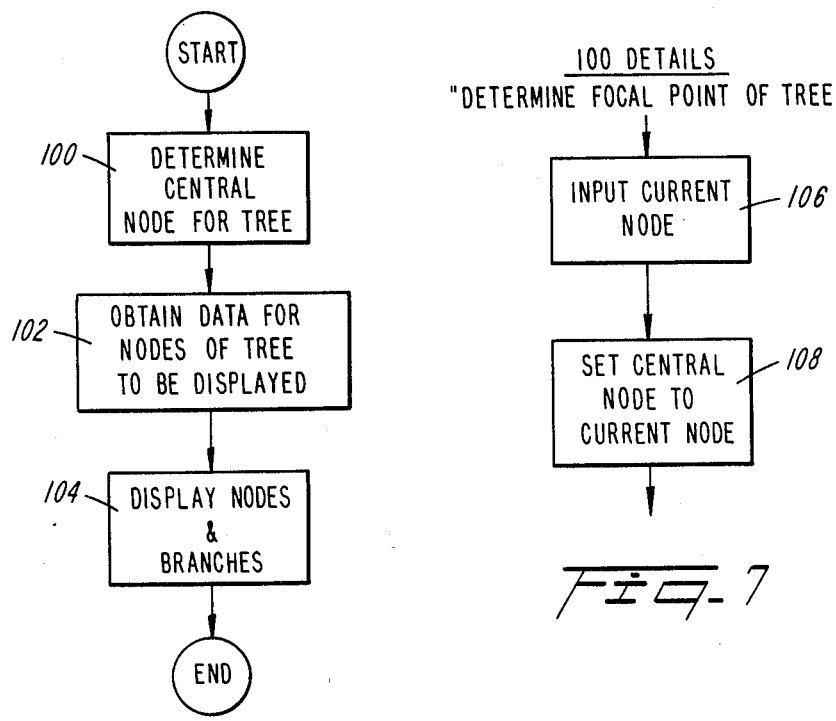
Fig. 6
Fig. 7

Fig. 4

SELECT MOST DESIRABLE HOUSE
TALLY FOR LEAF NODES

| LEVEL 1 | LEVEL 2 | LEVEL 3 | LEVEL 4 | LEVEL 5 |
|---|---|---|---|---|

FINANC'L = 674
- D'NPAYMT = 502
  - NEW DEV = 115
  - OLD/WORK = 349
  - DN/TWN = 38
- M'NPAYMT = 105
  - NEW DEV = 24
  - OLD/WORK = 73
  - DN/TWN = 8
- TAXES = 66
  - NEW DEV = 15
  - OLD/WORK = 46
  - DN/TWN = 5

PHYSICAL = 101
- SIZE = 57
  - NEW DEV = 4
  - OLD/WORK = 40
  - DN/TWN = 13
- CONDIT'N = 10
  - NEW DEV = 7
  - OLD/WORK = 1
  - DN/TWN = 2

LOCATION = 226
- SCHOOLS = 25
  - NEW DEV = 18
  - OLD/WORK = 6
  - DN/TWN = 2
- NEIGHBHD = 147
  - NEW DEV = 63
  - OLD/WORK = 63
  - DN/TWN = 21
- TRANSP'N = 53
  - NEW DEV = 3
  - OLD/WORK = 11
  - DN/TWN = 39

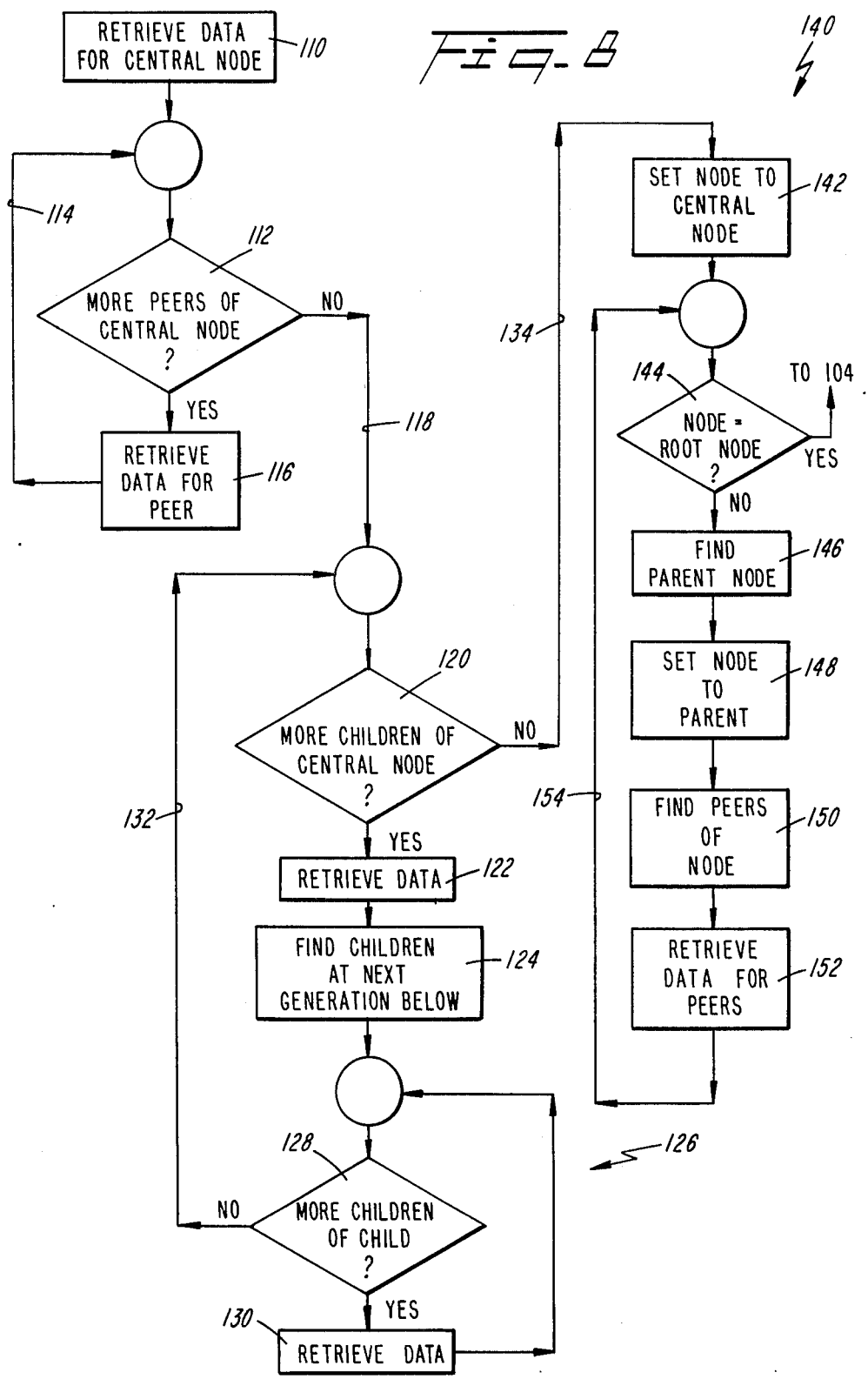

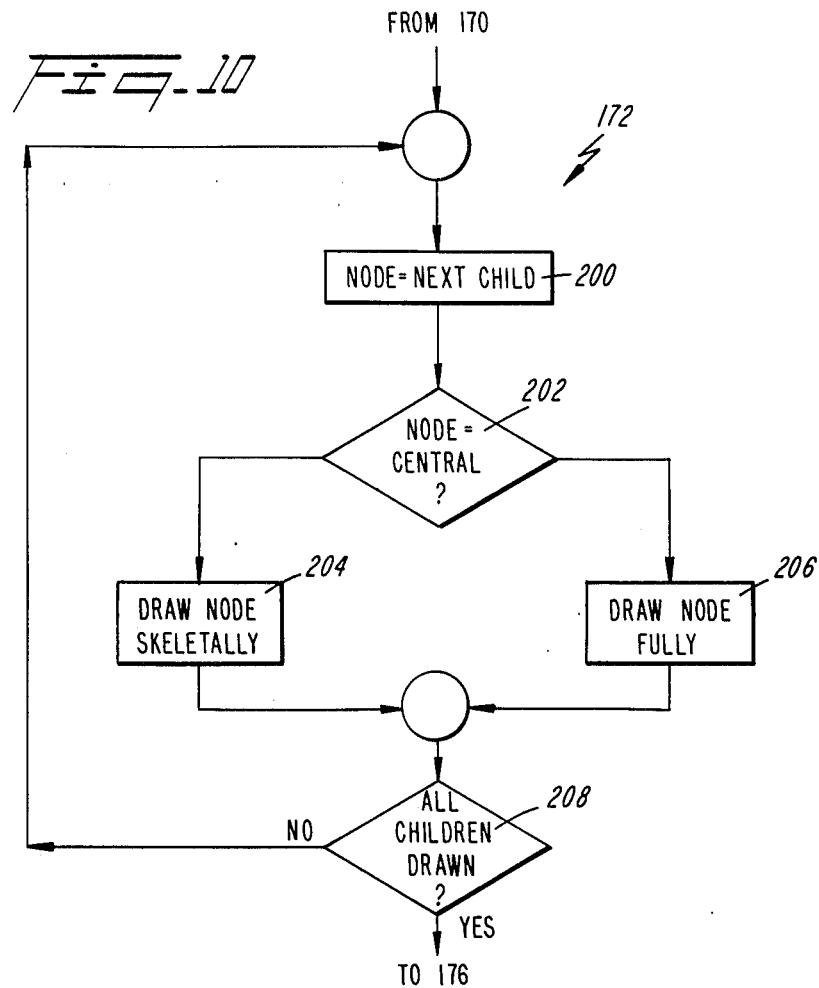
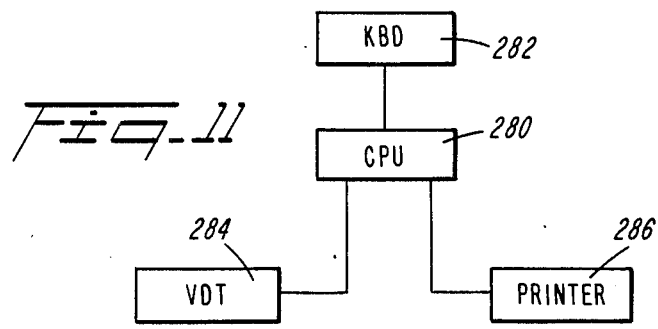

METHOD AND APPARATUS FOR GENERATING HIERARCHICAL DISPLAYS

TECHNICAL FIELD

This invention relates to display generation, and more specifically to display in a hierarchical, tree-like structure, of text and data developed by a programmed computer. The generated displays include both full and partial, or skeletal, portions of the tree structure. The invention is applicable to generation of summarizing reports for a user, whether as a transient display, on a VDT (video display terminal) for example, or in a hard copy, printed format.

BACKGROUND ART

Many interactive computer programs are presently available. In such programs, wherein a user provides input to a programmed processor, displays are generated by the processor to inform the user of entry of the inputs. Additionally, the results of computer operation on the input data are typically displayed for the benefit of the user.

Typically, the output displays are merely in the form of listings of input or result, whether in the form of numerical or literal information. In many instances, however, the arrangement of the information to be displayed is of significance to the user because of the relational information conveyed by such an arrangement. Frequently such relational information may be best conveyed by a hierarchical arrangement of the data, such as found in well known tree-like structure. Illustrations of the use of such tree structures abound, and include published descriptions of methods useful in reaching decisions based on a number of criteria, and also descriptions of organizational hierarchies, as but two examples.

With respect to methods for aiding in decision making, for example, it is known to select a target goal, a number of criteria to be considered in choosing among a plurality of alternatives which may be taken to achieve the desired goal, and possibly to obtain a number of subcriteria which may be considered in reaching the decision. Weights are assigned to the various criteria, and an assessment is made with respect to determining how well each of the alternatives relate to the criteria. Where subcriteria are involved, the process becomes more complicated in that the actual weight to be given any of the subcriteria is dependent on the weight assigned to the criterion with which the subcriterion is associated.

Finally, each of the alternatives is assessed with respect to each of the criteria or subcriteria which have been identified, the assessment of the alternatives being weighted by the weights previously assigned to the decision making criteria. The alternative having the largest sum of weighted assessments may be considered to be that alternative most suited for achieving the desired goal in accordance with the identified criteria. See, for example, the detailed description of such a process described in Saaty, Thomas L., *Decision Making for Leaders*, Wadsworth, Inc., Belmont, Calif. 1982, incorporated herein by reference. Other algorithms for assisting in decision making are known.

Clearly, such a decision making process becomes quite complex. In order to simplify the interaction between the user and the computer, a tree structure is helpful.

However, none of the interactive systems available in the marketplace, whether for use in decision making or other applications, provide for generation of such tree structures. Thus, in any prior art system relating to a number of complex operations among variables having relational characteristics, a user is required to generate any relational or hierarchical chart manually, using paper and pencil in an inexact operation prone to error.

Additionally, in many applications which benefit from a readily generated and readily available hierarchical tree chart, it is sometimes feasible to view only a portion of the chart because of display limitations. Further, in order to focus a user's attention on particular features and relationships illustrated by the chart, it is often advantageous to view only a portion of the chart.

That is, where a tree structure is characterized by a plurality of nodes interconected by a plurality of branches, it is sometimes desirable to view only a single subset of related nodes, rather than the entire set of nodes. Although the partial tree structure may be generated by hand, machine generation of the same advantageously provides emphasis on a particular node whenever needed, without the requirement of manual intervention.

Preferably, such a partial tree structure should include full information pertinent to a node or nodes of interest, as well as the interconnecting structure relating the nodes of interest, together with at least minimal information concerning the remaining nodes of the structure. Particularly, such a partial tree structure should display the relational interconnection of at least some of the remaining nodes to the nodes of interest, but need not display specific data associated therewith.

Such skeletal tree structures are helpful in an organization chart, for example, in illustrating a chain of command which may exist among a plurality of departments or offices of the organization. Therein, it maybe advantageous to indicate the existence of the remaining departments or offices for the sake of completeness, although complete information is unnecessary for the omitted departments. It is particularly helpful to be able to generate such a skeletal chart focusing on any desired department as its center.

Prior art display generating systems, however, are deficient in the above described areas and fail to provide either temporary or permanent displays of tree structures. The prior art fails particularly to provide such tree structure displays in association with decision making systems implemented on programmed digital computers.

For example, in a known, commercially available, decision making software system, there are provided menu driven interactions between the system and user. The system provides a machine implemented algorithm similar to that hereinabove described, and includes a number of prompts for the user. Each user response provides additional data to the system, which accepts and manipulates the same and performs the necessary computations. However, the system fails to generate any display to enable the user to assimilate the various relational information in an integrated manner.

Instead, there is provided only a confirming display of the user generated input, relating to the various criteria, alternatives, weights to be assigned to the criteria, etc. Additionally, the results of system computations are displayed, including ultimate priority to be given to the various alternatives in accordance with the previously input weights assigned to the several criteria identified by the user.

It is thus difficult for a user to utilize such a system and to assimilate quickly and efficiently the relations among the varius criteria, subcriteria, and alternatives provided to reach the desired goal. It is particularly difficult to obtain a rapid overview of the interrelationships among the various variables involved in the problem being solved.

DISCLOSURE OF INVENTION

It is accordingly a primary object of the present invention to implement a process for operating a programmed computer to generate a multi-level tree structure.

It is a more specific object of the invention to provide a machine generated display of a hierarchical tree structure including a plurality of nodes and branches connecting said nodes in accordance with predetermined relationships therebetween.

It is yet another object of the invention to provide a machine generated display of a tree structure and selectively to provide a skeletal display of a subset of nodes on branches of the tree, including a complete display of a first subset of nodes forming a subtree within the tree, together with all data associated with said first subset of nodes, and a skeletal display of a further subset of nodes of the tree having a predetermined relationship to said first subset.

It is an additional object of the invention to provide a skeletal tree structure display wherein data associated with a first subset of nodes forming a subtree of a tree are displayed along with said subtree structure and data associated with a further subset of nodes are omitted, the skeletal tree display including only the first and further subsets of nodes and the branches connected thereto.

A further object of the invention is the provision of a machine generated display of a tree structure as an aid to a user providing input data to a computer programmed to solve a hierarchically arranged problem.

It is still a further object of the invention to provide a skeletal display of a tree structure emphasizing a first subset of nodes by providing descriptive data adjacent a display of said nodes, and to provide additional display data associated with a further subset of nodes at locations removed therefrom.

It is another object of the invention to provide, for a computer implemented decision making algorithm including therein the steps of selecting verbal or numerical pairwise comparisons among a plurality of criteria and alternatives of the decision, a machine generated output display of a tree structure illustrating the relationships among said criteria and said decision alternatives.

Yet another object of the invention is the provision of a machine generated skeletal output display for a decision making algorithm.

It is an additional object of the invention to provide a machine generated hierarchical tree structure display on a transient display and to provide a permanent copy of such a display in an output report.

In accordance with the foregoing and other objects of the invention, there is provided a method for displaying information in a tree structure on a system having an input, a display and a control therefor. The inventive method comprises the steps of providing input data from the input to the control representing a root of the tree and the nodes for a $K^{th}$ level thereof, together with receiving of data representing a relationship between the $K^{th}$ level nodes and antecedent nodes thereof on a level $K-1$. The steps are repeated until all the $K^{th}$ level nodes are provided to the control, and for several values of K to represent the tree on the display. The control is operated for causing the system display to display the nodes of the various levels along with the connections between these nodes and antecedent nodes thereof, on other levels.

Preferably, the inventive method provides for input of literal information associated with the various nodes and display of the information adjacent the nodes. Additionally, the input provides data to the control indicative of a particular node of the $K^{th}$ level for display along with its descendent nodes and literal information associated with each, and antecedent and peer nodes of the particular node are displayed skeletally, independently of any literal information associated therewith. Branch connections between the particular node and the peer, antecedent and descendent nodes are also displayed.

Moreover, an input signal may be provided for redrawing a tree or skeletal tree display to emphasize a differently determined particular mode along with its peers, antecedent and descendent nodes. The information associated with the particular node and its descendent nodes may be displayed immediately adjacent these nodes, while the information associated with the antecedent and descendent nodes may be displayed remotely from those nodes.

In accordance with another aspect of the invention, there is provided a method for displaying a decision making algorithm on a computer activated display having an input, a processor and a display. In the inventive method, data representative of a target goal are provided to the processor, along with data representative of factors significant in attaining the goal. Pairwise comparisons of the significance of the factors are made and weights are assigned to each of the factors. Similar comparisons are provided for a number of subfactors associated with the factors, and weights are assigned thereto. A tree structure is developed to correspond to the various factors, subfactors, target goal, and various descendency relationships therebetween, and the tree is displayed on the display.

In addition to the local significance of the subfactors, the global significance thereof may be assigned for display in accordance with the global significance of a factor associated therewith and represented by an antecedent node thereof.

The display, as previously described, may be complete or skeletal, including either all or some of the structure of the tree. Moreover, assignment of the weights to the factors may be based on either verbal or numerical pairwise comparisons of the significance thereof, based on qualitative or quantitative criteria. Further, the number of subfactors associated with any one factor need not be the same as that of any other factor.

In yet another aspect of the invention, in a process implemented on a programmed computer for selecting among a plurality of alternatives, a report is generated by determining a tree structure to include a plurality of nodes and connecting branches therefor. A central node is selected for inclusion in the report, and complete data is provided in association therewith and in association with descendent nodes thereof, while skeletal data are provided for other nodes of the tree. The other nodes may include peer nodes of the central node, antecedent nodes thereof, and peer nodes of the antecedent nodes. The report may be provided on a transient medium or may be printed on a print carrying medium.

Still other objects and features of the present invention will become readily apparent to those skilled in the art from the following description of one specific embodiment thereof, especially when taken in conjunction with the accompanying drawings.

BRIEF DESCRIPTION OF THE DRAWING

FIGS. 3 and 4 show formats for illustration of a tree structure in a printed report in accordance with the invention;

FIG. 6 illustrates a sample flow chart broadly descriptive of a method for implementing the inventive method on a programmed computer;

FIG. 7 shows a detail of FIG. 6;

FIG. 8 illustrates a detailed flow chart for obtaining data for nodes to be displayed;

FIG. 10 illustrates a detail of the flow chart of FIG. 9; and FIG. 11 shows an apparatus which may be used to carry out the inventive method.

Referring now to FIG. 1, a tree structure of the type generated in accordance with the present invention is illustrated generally at 10. As is apparent from the figure, the tree is in an inverted form. Included therein are a plurality of levels, each level having one or more nodes.

At the $0^{th}$ level there is provided a root node 12. Descending therefrom to level 1 are a plurality of descendent nodes. As will be apparent from the following definitions, the nodes at level 1 form a peer group of nodes, enclosed for purposes of illustration by a dashed line 14. Generally, a node on level K will be connected by a branch of the tree structure to a node on level K−1. Similarly, a node on level K may be connected by a branch to a subsequent node on level K+M descending therefrom. Although a tree structure may have branch connections from a node on level K to a node on level K+M for any value of M, in the preferred embodiment M is equal to 1. That is, any node N may only be connected to its direct ancestor or descendent nodes removed therefrom by one level. Nodes descending from a common node are identified as a peer group, as illustrated by all the nodes on level 1 and as further illustrated by a peer group 16 on level 2.

For purposes of clarification, a number of terms utilized in connection with a tree structure are defined as follows:

TREE

A tree (also called a hierarchy) is a structure which has NODES, and BRANCHES. The NODES are represented on the display screen and in the output report by either boxes or small circles, depending on the level of detail shown for a given part of the tree. Nodes in one level are connected by branches to nodes in the next levels, either below or above.

Nodes in a tree are organized in levels. The topmost level, Level 0, has only one node and is called the root of the tree. In a decision making algorithm, the root represents the GOAL. Each node below Level 0 is connected to one and only one antecedent node above it (i.e., a node has only one parent node), but may be connected to many descendent nodes below (illustratively, a node may have up to seven descendent nodes). Attention is often focused on a particular node and its descendent nodes.

NODES

Nodes are juncture points in the tree.

LEVELS

All nodes that are descendents of the GOAL node are said to be in Level 1. Descendents of nodes in Level 1 are said to be in Level 2, etc. Levels are numbered downward with the GOAL node being at Level 0, nodes in the next level at Level 1, and so on. Although any number of levels may be provided, for illustrative purposes the lowest permitted level will be set at 5.

ANTECEDENT (PARENT)

The node in the next higher level to which a node is connected. A node has only one parent.

DESCENDENTS (BRANCH, or CHILDREN NODES)

Branch nodes are all the nodes in the next lower level to which a particular node in a given level is connected. For illustration, each node may have up to seven descendent or branch nodes.

PEER NODES

These are nodes having the same parent.

LEAVES (ALTERNATIVES)

The nodes at the bottom level of the tree are the leaves. In a decision making algorithm, the leaves are the alternatives among which the choice is to be made.

NODE NUMBER

Figure 1:
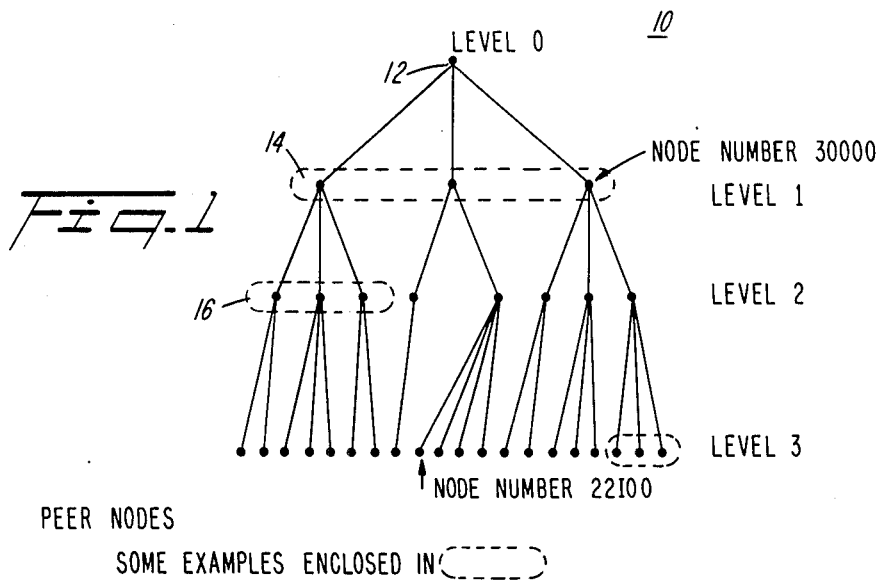
FIG. 1 shows a tree structure including definitions of specific elements thereof as used in the present invention.

Each node may be identified by a five digit number, one digit for each possible level below the goal. The $K^{th}$ digit represents the left-to-right placement of a node or its antecedent in a group of peer nodes on the $K^{th}$ level. Thus, the left-most digit represents the position (1 to 7) of a node or of its antecedent in Level 1 of the tree. The second digit represents the position (1 to 7) of a node or of its antecedent among peers in Level 2 of the tree, and so on. For example, the node number 22100, shown in FIG. 1, is a descendent of the second node in Level 1, the second peer in Level 2, and is itself the first branch node in Level 3. Thus, the first three digits of its node number are 221. The fourth and fifth digits are 00, as this node is located above the corresponding Levels 4 and 5.

PAIRWISE COMPARISONS (JUDGMENTS)

These are judgments expressing the intensity of dominance or preference of one node over another with respect to a given criterion in a decision making algorithm. Judgments can be expressed either verbally or numerically.

LOCAL PRIORITIES

Local priorities are the priorities of nodes relative to their peer nodes as determined by pairwise comparisons.

GLOBAL PRIORITIES

For a decision making algorithm, global priorities are the priorities of nodes relative to an overall or global decision, determined by weighting the local priority by the global priority of the parent node.

SYNTHESIZING

Synthesizing is the adding of global priorities of nodes representing a particular criterion (or alternative), which results in the overall priority for that criterion (or alternative). Of special interest are the overall global priorities of the alternatives at the bottom level (the leaf nodes).

The following illustrates application of the tree structure to a procedure for deciding on a house to buy. This problem, along with others of varying complexity, is described in an instruction manual for a decision making algorithm "EXPERT CHOICE", available from Decision Support Software, Inc., of McLean, Va., incorporated herein by reference.

A house-buying decision involves such factors as financial considerations, geographical location, physical appearance, yard space, neighborhood, convenience of schools, property taxes, down payment, monthly payment, commuting ease, and many others. There are usually too many factors in such a situation to be kept in mind at one time. In accordance with the invention, a computer implementation of a decision making algorithm includes a tree structure to enable a user to organize the factors, with the most important general ones in the top level, detailed breakdowns thereof in lower levels, and alternatives of choice in the bottom level. Thus, the entire problem is reduced to smaller, manageable problems. For demonstration purposes the example shown is small. Many more factors could be added that are specifically oriented to a particular buyer's needs, and may be displayed in the tree structure of the invention.

In the house selection problem, the structure might be arranged with the main goal "Select the Most Desirable House" on Level 0, the major elements of Financial, Physical and Location on Level 1, more detailed criteria of these elements on Level 2, and the alternative houses New Development, Old/Work, and Downtown under consideration on Level 3. The tree structure of the house-buying example is shown in FIG. 2 and clearly displays the choice to be made, the main criteria used in making the choice, the factors significant in each of the main criteria, and the particular alternatives to be considered.

When presented in such a format the problem is more easily assimilated by the computer user, and conveys, by the interconnections thereof, substantially more information than conveyed by a direct listing of the criteria and subcriteria.

Figure 2:
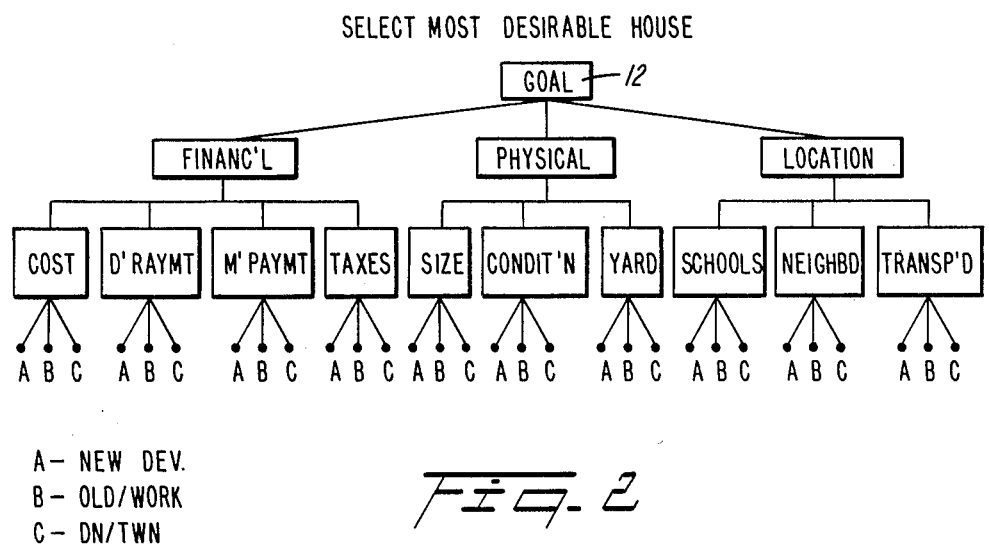
FIG. 2 illustrates a display of a tree structure in accordance with the invention.

In the structure of FIG. 2, there is provided a single node, identified as the GOAL, at Level 0 of the tree structure. This node corresponds to the root node previously defined. At the first level of the tree structure there are provided the most general criteria of significance to the problem. For purposes of illustration in the instant problem, these criteria may be FINANCIAL, PHYSICAL, and LOCATION considerations associated with the first level nodes.

The nodes on Level 2 are a more detailed breakdown of the elements in the first level. They are subcriteria used in reaching the goal and together form the general criteria as follows. Thus, the FINANCIAL criteron comprises the subcriteria of COST (the initial price), DOWNPAYMENT (the down payment required), MONTHLY PAYMENT (the monthly cost which covers everthing else), and TAXES.

The first level node marked PHYSICAL may be composed of SIZE, CONDITION, and YARD. Finally, the node marked LOCATION is composed of SCHOOLS (their number and neatness), NEIGHBORHOOD (an assessment of the general quality of the neighborhood so far as the prospective buyer is concerned), and TRANSPORTATION (idenifying the quality of transportation services).

On the third level there are illustrated the specific alternatives to be considered in reaching the desired goal. The houses under consideration are NEW DEVELOPMENT (representing a tract type house far from town), OLD/WORK (representing an older home requiring a considerable amount of restoration), and DOWNTOWN (representing a condominium apartment in the center of town).

In accordance with the invention the entire tree structure is generated before entering any judgments, since knowledge of the importance of the criteria depends on knowledge of the alternatives at the bottom level and of the grouping and relationships among the various criteria, subcriteria, and alternatives. A problem model is generated in the form of a tree. The model also contains judgments, either the initial judgments of equality, which are automatically entered as the tree is generated, or judgments entered during previous work sessions. As is apparent from FIG. 2, the decision making problem is easily comprehended with the aid of a tree structure, particularly when generated by the system for display to the user.

With the aid of the present invention, the tree structure of FIG. 2 may be generated, including therein the various priority values associated with each of the criteria and subcriteria used in reaching the decision. Such a structure may be generated interactively on a VDT display and may further be provided on a hard copy report generated by the system, as shown in FIG. 3. In an alternative format, the tree structure may be printed in the form shown in FIG. 4, wherein each node and leaf is shown together with the global priority thereof and the full textual identification thereof.

Thus, although the tree structure itself may be graphically generated by the inventive method, as shown in FIG. 3, it is also possible to provide all the information associated with the tree structure without the graphic display associated therewith, as illustrated by the report shown in FIG. 4.

Figure 5:
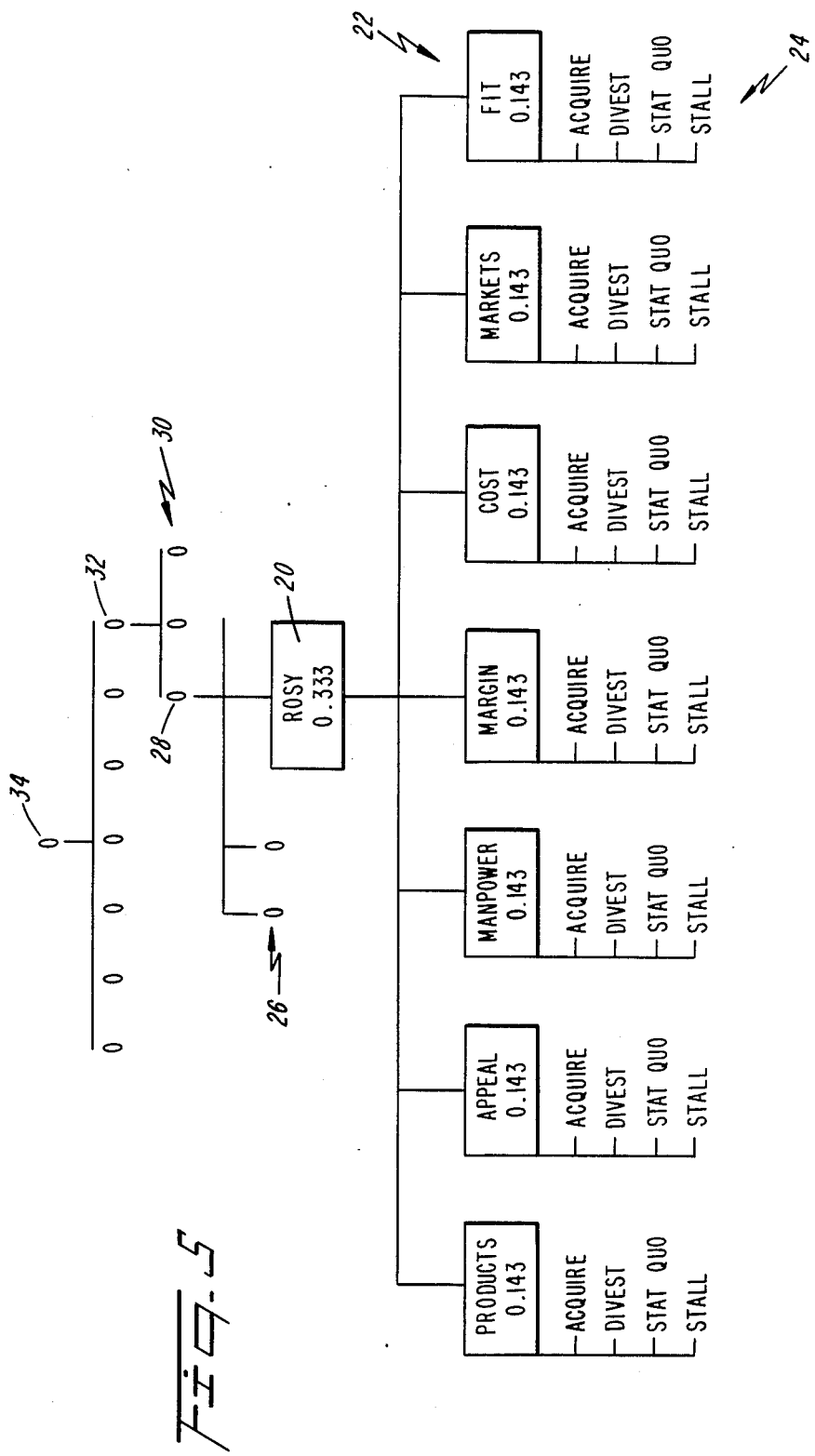
FIG. 5 illustrates a skeletal display generated in accordance with the invention.

In accordance with the invention, there is further provided an output display, whether in transient form in association with the interactive transaction or in a printed output format, which highlights a specific node of interest together with its descendent nodes. Such a display is shown in FIG. 5, wherein a particular node of interest 20 is identified by the user. The identification data, which may comprise the node number, are provided to the display generator. Responsive to receipt of the node identification and a command to provide a skeletal display, the particular node is made a central node of the display. That is, the identified node is displayed as a root node for a subtree structure associated therewith. Each of the descendent nodes 22 of the central node is displayed, including textual and numerical information. Additionally, any descendent nodes of the descendent nodes 22 are similarly displayed. In the illustration of FIG. 5, obtained from an application of the invention to yet another decision making problem, the descendents of nodes 22 are the leaves 24, forming the alternatives for consideration in reaching the ultimate decision.

Although it is possible to display a complete subtree in which the central node is in fact made a root therefor, in the preferred embodiment there is provided a truncated subtree. For reasons of limited display space, it is only the descendents of the central node and their descendents which are shown together with full textual information. Thus, in the preferred embodiment there is provided a skeletal display portion, tracing the lineage of the central node to the tree root, and a full display portion, displaying the central node, its "CHILDREN" nodes and its "GRANDCHILDREN" nodes.

Thus, the present invention provides for generation of a subtree of the complete tree structure. Additionally, in order to illustrate the proper placement of the central node within the hierarchical structure, a number of additional nodes of the tree are displayed. Particularly, in accordance with the invention all peer nodes of the central node, shown at 26, are displayed. The antecedent node of the central node and thus of its peers is similarly displayed as shown at 28. The peer nodes of the antecedent node are also displayed as shown at 30. Moreover, the antecedent node thereof is provided at 32, as are its peer nodes thereof. The display thus shows each of the antecedent nodes of the central node, together with the peer nodes of any such antecedent node, tracing the descendency of the central node to the root node 34.

However, unlike the central node and its descendents, the antecedent nodes and their peers are shown only skeletally, independently of the data associated therewith. Thus, for the particularly selected central node and its descendents there are provided full textual data, while for the nodes related thereto, shown by the various antecedents and peers, it is only the relational positioning which is displayed.

Such a display is helpful in focusing attention on a specific subset of nodes, forming a subtree of the tree structure, while maintaining the significance of the subtree to the entire tree structure in perspective. A significant advantage of the invention is the ability to display a complex tree structure in a limited space available in a display. The textual or numerical description associated with only a subset of the tree nodes and branches may be displayed, while such data are omitted from the display for the remaining nodes. Thus, although the entire tree structure may be displayed, the present invention also permits a display of only a portion of the data, thus conforming the structure to fit within a limited space.

Referring now to FIG. 6 of the drawing, there is illustrated a partial flow chart describing the inventive method in its broadest terms.

As shown therein, the inventive method provides for display of a tree having a specified focal point, or central node. In a situation wherein the entire tree is to be displayed, the central node or focal point of the tree will be the root node. In a situation wherein a "redraw" command is entered, however, the central node of the tree is determined by a node identification number input by the user and is provided to a processor or other controller at step 100. At step 102 the controller obtains data for the various nodes of the tree to be displayed, whether all the nodes of the tree or only a particular subset of the nodes. At step 104, the various nodes and interconnecting branches are displayed. As will become apparent from the more detailed illustration of the preferred embodiment shown in FIGS. 7-10, when a "redraw" command is provided there may be displayed only the desired subset of nodes having the selected central node as its root node.

With reference to step 100 of the flow chart of FIG. 6, determination of the central node is obtained by inputting the current node at step 106, followed by setting the central node to be the current node at step 108. More particularly, if the user is merely inputting all the nodes of the tree, and in the event that it is the entire tree which is to be provided as an output, the initial, or root, node is the "current node" input at step 106 which is, thereafter, set to be the central node at step 108. However, if a "redraw" command is to be executed, a specific node which has been selected by the user to represent the root of a partial subtree for display is input at step 106. This node is then set to be the central node at step 108.

Having determined the focal point for the tree at step 100 as further clarified by steps 106 and 108, the inventive method obtains data representative of the nodes to be displayed. This step is carried out at 102 in FIG. 6, and is described in greater detail in FIG. 8. It is noted that, to a large measure, the inventive method is enabled by the node numbering system hereinabove described. Thus, having identified a specific node at level K, its peer nodes may be identified as all nodes having non-zero portions of the node identification numbers of the same length K as the specific node and having identical prefixes of length $K-1$. Ancestors of successive generations may be identified as nodes having successively shorter node identification numbers which are identical with successively shorter prefix portions of the node number identifying the desired node. Similarly, successive descendent nodes of the node of interest may be identified as those nodes having non-zero portions of the respective node numbers which are successively longer than that of the node of interest, and which have the non-zero portion of the node number of interest as a prefix thereof.

Referring now to FIG. 8, the sequence of steps performed to carry out step 102 of FIG. 6 includes a step 110 in which data descriptive of the central node are first retrieved from storage. At step 112 it is determined whether additional peers exist for the central node. If such peers in fact exist, the inventive system provides for a loop represented by 114 in which data for such peers are retrieved at step 116. Clearly, the performance of step 116 may include incrementation of a counter in order to obtain data associated with successive nodes identified (as hereinabove described) as peer nodes for the central node. Once all peer nodes have been identified and the data associated therewith retrieved, the method exits step 112 at 118 to determine whether the central node has any descendent, or children, nodes. This determination is made at step 120.

In the event that such children nodes are found, as may be determined by examination of the node numbers for all nodes of the tree, the data associated with a first of the descendent nodes are obtained at step 122. At step 124 the descendent nodes of that descendent nodes are found. That is, at step 124 the "grandchildren" of the central node are determined. Thereafter, a loop 126 is included as a part of the inventive method, in which the individual "grandchildren" nodes are examined. For each such "grandchild" node, at step 128 it is determined whether additional "grandchildren" exist. If additional such second generation descendents are found to exist, step 130 provides for retrievel of data associated with these second generation descendents. Loop 126 then calls for again determining whether additional second generation descendent nodes exist.

At one point there will be determined in step 128 that no further "grandchildren" nodes exist for the central node of interest. In that event, the inventive method calls for completion of a loop by passage through 132 to a further iteration of step 120. Thus, steps 110 through 130 provide a determination of each of the peers of the central node (steps 110–116) and, thereafter, for determination of each of the first and second level descendents of the central node (steps 120–132).

Once it is determined that all the first and second level descendents of the central node have been specified and that the data associated therewith have been retrieved, the method according to the present invention passes via 134 to the segment 140, wherein the various ancestors are found for the central node, up to the root node. Thus, at step 142 a "node" variable is set to equal to the central node. At step 144 it is determined whether the node variable in fact is the root node. In the event that the node variable is not the root node, the parent node thereof is found at step 146. At step 148 the node variable is set to the parent node, and the peers of the parent node are found at step 150, calling for identification of the peers of the node variable. At step 152 the data associated with the peers are obtained, and, passing through 154, the method returns to another iteration of step 144. In this iteration it is determined whether the node variable, which at step 148 was set to equal the parent node, is the root node. If not, the sequence illustrated by 140 repeats, until at one point the parent node is determined at step 144 to be the root node for the tree. In that event, the method proceeds with performance of step 104 of FIG. 6.

Figure 9:
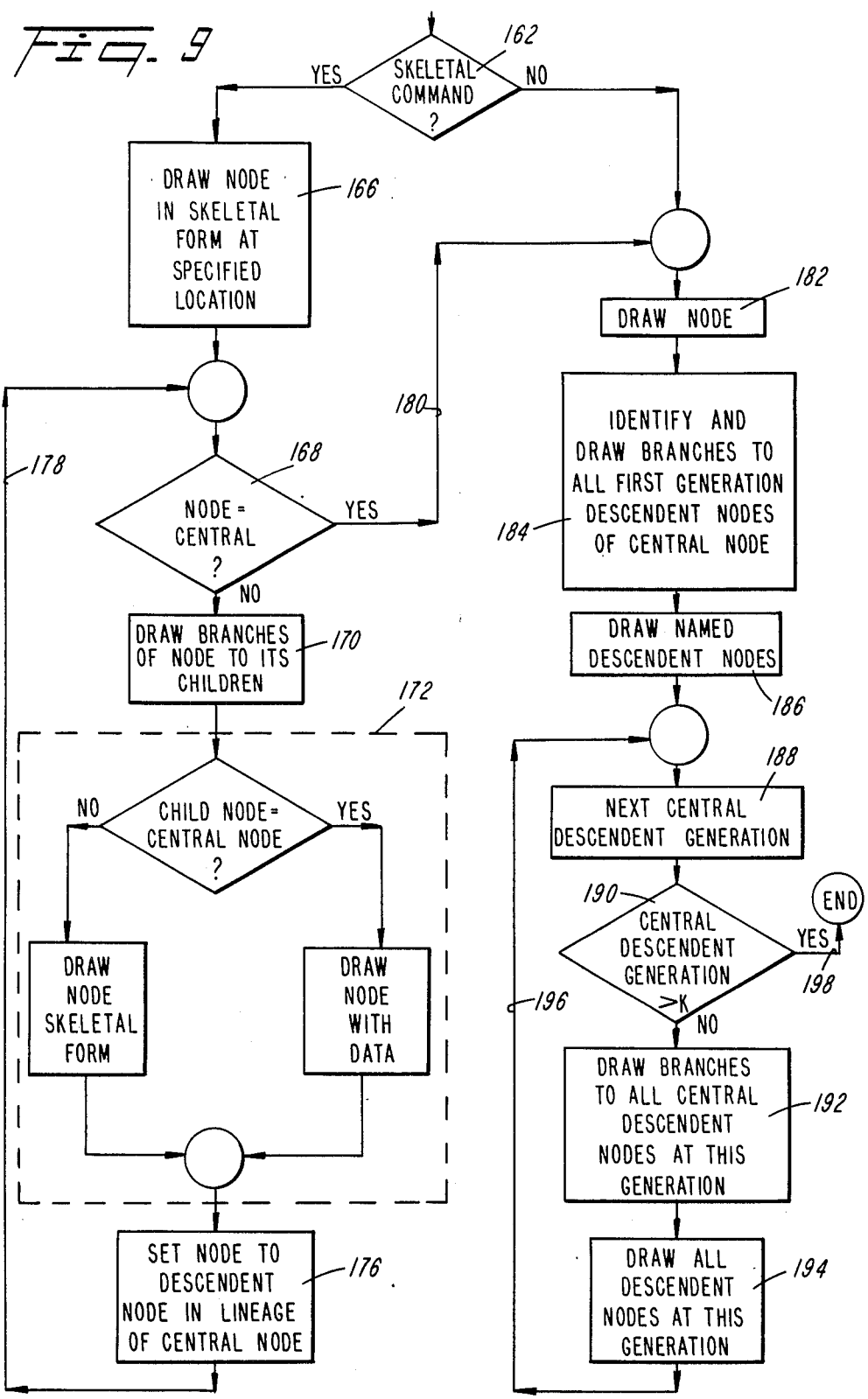
FIG. 9 illustrates details of the flow chart of FIG. 6 for generating a skeletal tree structure.

The details of step 104 are illustrated in FIG. 9. Therein, since the node variable in fact equals the root node, it is first determined at step 162 whether the node is the central node forming the focal point of the tree being constructed. If the node is the central node, the method proceeds to step 182. Otherwise, the method proceeds to step 166 in which the node represented by the node variable is drawn in skeletal form at a specified location. At step 168 it is determined whether the node variable represents the central node. For the situation in which the node variable does not equal the central node, the present method calls for execution of step 170 in which the various branches of the node variable are drawn to its first generation descendents, previously described as its "children". It will be recalled that the data associated with the children nodes were obtained at step 122 of FIG. 8. Thus, the location of the children nodes is known so that the branches may be drawn to the appropriate locations at step 170.

In accordance with the invention there is then performed a sequence of steps collectively labeled 172, in which the children nodes are tested for identity with the central node in order to determine whether the full information is provided in the display or the children nodes are to be drawn only in skeletal form. Generally speaking, the sequence of steps 172 first tests to see whether the child node to be drawn is or is not equal to the central node. If the child node of interest is not the central node, the drawing is provided in skeletal form. If the child node, however, is in fact equal to the central node, it is drawn together with associated data.

Thereafter, the node variable is successively set at step 176 to the various descendent nodes in direct lineage descendency from the central node. Having set the node variable to such descendent nodes, the inventive method, via 178, calls for a further execution of step 168. Thus, having determined the antecedent and descendent nodes in accordance with FIG. 8, the method at FIG. 9 draws the branches from the root node to the descendents thereof and, in conjunction with step 176, traces the lineage of the central node. Once the branch has been drawn to the central node, the central node is drawn with its associated data and the method exits the determination of step 168 by path 180 to step 182. It should thus be noted that step 182, in which the node is drawn with data, is executed only after the central node has been reached from the root node as a descendent thereof.

It should also be noted that a second path exists to execute step 182. Specifically, if the redrawing command does not call for a skeletal structure, step 162 provides a negative result which similarly calls for drawing the various nodes to include the associated data. Accordingly, when the response to step 162 is in the negative, step 182 is executed. It should further be recalled that step 162 is executed after exiting step 144 in FIG. 8. Thus, step 182, when entered from step 162, provides a drawing of the root node together with associated data. it should be recognized that the step of sequence 172 which calls for drawing the nodes together with the associated data may be the same step illustrated at 182, and that step 168 may be eliminated in favor of the determination within the sequence 172 of whether the child node is identical with the central node.

At any rate, execution of step 182 is indicative of entrance into a sequence of operations in which all the descendent nodes are to be drawn with accompanying data. Thus, step 184 provides for drawing branches from the specific node variable to all of its first generation descendents which are either the descendents of the central node selected as the focal point for the tree or descendents of the root node when the redrawing command does not require a skeletal redrawing of the tree. Step 186 thus provides for drawing each of the first generation descendent nodes identified at step 184 together with the associated data. Step 188 determines the next generation of descendents from the central node.

As previously mentioned, the number of generation which may be displayed or printed together with the full associated data may include all generations of the tree. Alternatively, in view of display space economy, the invention may provide a limitation on the number of generations to be displayed. In the presently preferred embodiment there are provided two generations of descendents of a central node which may be displayed with the full (nonskeletal) data associated therewith. Thus, at step 190 there is provided a test to determine whether a predetermined number of generations of descendents has been drawn. In the event that the predetermined number has not been exceeded, the inventive method provides execution of step 192 wherein branches are drawn to each of the descendent nodes of the central node in the next generation. Step 194 provides for drawing each of these nodes, the invention returning at 196 to further execute step 188. That is, the next subsequent generation of descendents is determined at step 188, this generation being compared with the predetermined limit therefor at step 190. If the predetermined limit on the number of generations to be displayed has been exceeded, the inventive method exits at 198.

To illustrate details of the segment of FIG. 9 shown at 172, in which the individual children nodes are drawn either skeletally or with data, there is shown the flow chart of Figure 10. Therein there is provided at step 200 an incrementation of the child count and the node variable. Thus, the node variable is set equal to the next child node of the central node. At step 202 the node variable is compared with the central node. If the comparison is negative, that is, if the node variable represents an antecendent of the central node, the node represented thereby is drawn skeletally at step 204. If, however, the comparison of step 202 is affirmative, then step 206 provides for drawing the node variable with the full associated data, since this node variable in fact represents the central node of the skeletal subtree to be redrawn. Subsequently, having drawn the node either skeletally or fully in accordance with steps 204 or 206, the method provides at step 208 for a determination of whether each of the children nodes which were determined at step 170 has been drawn. If the determination is negative, the method returns for a further iteration and execution of the sequence of steps 172. If the determination is affirmative, however, and an indication is provided that in fact all the children nodes have been drawn, the method continues with step 176.

Accordingly, the flow chart of FIG. 9 illustrates a procedure for fully displaying the central node and its descendents at two (or more) levels, and for displaying skeletally the peer nodes, antecedents, peers of antecedents, etc. for the central node, as shown at FIG. 5. Of course, modification of the portion of the method shown at 126 in FIG. 8 as well as of step 190 in FIG. 9 easily permits display of descendents of the central node at all levels, rather than at two levels only as provided in the preferred embodiment.

There has thus been described a method for generating a display of a tree structure, including an optional generation of a skeletal tree structure for any arbitrarily selected central node.

Preferably, the inventive method results in a transient or permanent hard copy display of a full tree structure displaying each of the nodes and branches of the tree, together with a display of all information associated with the various nodes. In order to highlight certain portions of the tree structure, the inventive method provides for display of a subtree of the tree, together with skeletal format display of a selected subset of the remaining tree nodes. In such a skeletal format display, a particular node is selected as a central node, or root node of the subtree, for which a full subtree structure is developed and displayed.

The peer nodes, antecedent nodes, as well as the peers of antecedents of the central node, are displayed skeletally to illustrate the hierarchical positioning of the central node within the tree structure.

It should be recognized that the descriptive data associated with each of the nodes presented in skeletal form need not be omitted entirely from the generated display. Such data may be displayed on a separate portion of the display, remotely from the skeletal nodes to avoid cluttering the display yet sufficiently nearby to permit a user to refer to the same as necessary.

It should also be recognized that the above-described method, which may be implemented with the aid of specifically designed hardware, may similarly be implemented with the aid of a programmed computer. Thus, there is shown at FIG. 11 a computer configuration usable for implementing the inventive method.

Therein, there is shown at 280 a central processor of the computer which may be programmed to implement the inventive method. A keyboard 282, or other input means, is provided for interaction between a user and the computer system. A VDT (video display terminal) 284, or other display means, is connected to the central processor for displaying various data to an operator. Finally, a printer 286, or other permanent record generator, is also connected to the central processor 280 and is driven thereby.

In operation, an operator inputs specific data to the central processor 280 in response to prompts displayed on the VDT 284.

Upon provision of all input data relating to identification of various nodes of the tree structure, such as by provision of labels for nodes associated with a decision making algorithm, the central processor may control the VDT and/or printer to provide transient and/or permanent output displays of the tree structure. Thereafter, during further interaction, decisions on pairwise comparisons of alternatives may be made in a decision making algorithm. These decisions may be implemented by inputting direct data via keyboard 282 or by responding to verbal comparison prompts displayed on VDT 284. In either case, the central processor may be programmed to generate a set of data for display together with the various nodes of the tree structure. The tree structure may again be output either as a hard copy report on printer 286 or as an electronic display on VDT 284 in response to an input command provided on keyboard 282.

Further, in response to other specific commands on keyboard 282, the skeletal display mode may be entered, as indicated in the flow chart of FIG. 9. Execution of the associated program by the central processor 280 results in a skeletal display such as illustrated in FIG. 5, the display being provided for output either on VDT 284 or on printer 286.

While there has been described and illustrated one specific embodiment of the invention, it will be clear that variations in the details of the embodiment specifically illustrated and described may be made without departing from the true spirit and scope of the invention as defined in the appended claims when interpreted in accordance with the full breadth to which the claims are legally and equitably entitled.

I claim:

1. A method for displaying information in a tree structure on a system having an input means, a display means and a control means comprising the steps of:

(a) providing from said input means to said control means input data representative of information associated with a root of the tree structure forming a $0^{th}$ node level therein;

(b) providing from said input means to said control means input data representative of nodes on a $K^{th}$ level in the tree structure where K is an integer;

(c) receiving input data from said input means representative of a relationship between said nodes on said K$^{th}$ level and nodes related thereto on a different level K+L where L is a nonzero integer;

(d) repeating steps (b) and (c) until information concerning all nodes for display on the K$^{th}$ level has been provided to said control means;

(e) operating said control means to generate control data for controlling said display means to display the nodes of said K$^{th}$ level and to display connections representing branches of said tree structure between said nodes and the nodes related thereto on said different level whereby any displayed node is displayed together with its related nodes;

(f) repeating steps (b) through (e) as necessary for successive values of K to represent a tree structure on said display means; and (g) displaying said nodes of said tree levels and said branch connections between said nodes and said related nodes, whereby a tree structure format is provided for displaying said input data.

2. A method as recited in claim 1 wherein said receiving step comprises a step of choosing L to be a positive integer for receiving data representative of descendent nodes of said nodes on said Kth level, said operating step comprises the step of controlling said display means to display connections between said nodes and said descendent nodes on a subsequent level, and said displaying step includes the step of displaying said nodes and said branch connections between said nodes and said descendent nodes.

3. A method as recited in claim 1 wherein said receiving step comprises a step of choosing L to be a negative integer for receiving data representative of antecedent nodes of said nodes on said Kth level, said operating step comprises the step of controlling said display means to display connections between said nodes and said antecedent nodes on an earlier level, and said displaying step includes the step of displaying said nodes and said branch connections between said nodes and said antecedent nodes.

4. A method as recited in claim 3 wherein step (b) comprises the step of providing literal information associated with said nodes on the K$^{th}$ level.

5. A method as recited in claim 4 wherein step (g) comprises the step of displaying said literal information along with said nodes on said display means.

6. A method as recited in claim 3 wherein step (b) comprises the step of providing literal information associated with said nodes; and comprising the further steps of:

providing input data from said input means to said control means indicative of a particular node on said K$^{th}$ level to be displayed;

displaying, on a level K+M where M is a nonzero integer, descendent nodes of said particular node on said K$^{th}$ level together with literal information associated therewith;

displaying antecedent nodes of said particular node on the K$^{th}$ level in a skeletal format independent of any literal information; and displaying connections between said particular node and said peer nodes, said descendent nodes, and said antecedent nodes thereof.

7. A method as recited in claim 6 comprising the further step of selecting M to equal 1.

8. A method as recited in claim 7 wherein said particular mode and said descendent nodes comprise the further step of displaying said literal information associated therewith immediately adjacent said particular node and said descendent nodes.

9. A method as recited in claim 8 wherein said step of displaying said antecedent and peer nodes comprises the further step of displaying literal information associated therewith in a display area remote from said antecedent and peer nodes.

10. A method as recited in claim 6 wherein said step of providing input data indicative of a particular node includes the step of providing an input signal for re-drawing an existing prior display of a previously defined particular node, its peers, antecedents and descendents, and said steps of displaying antecedent, peer and descendent nodes comprise the step of replacing said prior display of said previously defined particularly node, its peers, antecedents and descendents and the connections therebetween with a display of a newly defined particular node, its antecedents, peers and descendents and connections therebetween.

11. A method for displaying a decision making algorithm on a computer activated display having an input means, a processing means and a display means, comprising the steps of:

(a) providing input data from said input means to said processing means representative of a target goal to be attained;

(b) providing input data from said input means to said processing means representative of factors significant in attaining the target;

(c) providing input data from said input means to said processing means representative of pairwise comparison of significance of each of the factors in attaining the target;

(d) assigning to each of said factors a numerical value based on pairwise comparisons of the significance thereof in accordance with a computation performed on the results of said pairwise comparisons;

(e) providing input data from said input means to said processing means representative of subfactors significant in each of said factors;

(f) for each factor, providing input data from said input means to said processing means representative of results of pairwise comparisons of significance of each of the subfactors for said factor;

(g) assigning to each of said subfactors a numerical value representative of a local significance thereof to an antecedent factor thereof to which it is significant in accordance with a computation performed on the results of said pairwise comparisons;

(h) repeating steps (e), (f) and (g) for sub-subfactors of said subfactors until all factors and subfactors of interest are accounted for;

(i) displaying on said display means a tree structure including a root, a plurality of nodes and branches connecting said nodes representing said target, factors, subfactors, subsubfactors and the like, and descendency relations between nodes on different levels, respectively.

12. A method as recited in claim 11 wherein said secondary step of assigning comprises the further step of assigning for display with said subfactors or the like represented in said display by a node a numerical value representative of a global significance thereof for attaining the target goal in accordance with a computation based on the local significance thereof and a global significance value of a factor reprsented by an antecedent node thereof.

13. A method as recited in claim 11 wherein said displaying step comprises the step of displaying at least one of said nodes on said display means of a $K^{th}$ level of a tree, along with antecedent nodes on levels K−L is a nonzero integer, and descendent nodes thereof on levels K+M, where M is a nonzero integer, together with literal information descriptive thereof.

14. A method as recited in claim 13 further comprising the step of displaying at least some nodes on said tree structure in skeletal form including only nodes, branches, and antecedent nodes thereof, independently of literal information descriptive thereof.

15. A method as recited in claim 11 wherein said first assigning step comprises the further step of displaying verbal qualitative descriptions of pairwise relationships for selection and assignment of an appropriate one of said descriptions to the relationships between each pair of factors and between each pair of subfactors.

16. A method as recited in claim 11 comprising the further step of providing different numbers of subfactors for two of said factors.

17. In a method for executing on a programmed computer a process for selecting among a plurality of alternatives to achieve a desired goal, including performing pairwise comparisons among a plurality of criteria to obtain weighting factors for each of said criteria and, for each criterion, performing pairwise comparisons among said plural alternatives to obtain numerical values associated with each of said alternatives, and, based on said comparisons for each criterion, selecting an alternative having the highest numerical value, the improvement comprising:

a method for generating an output report including the steps of
(a) generating a node grouping having a plurality of nodes and branches arranged in a tree structure including a root node, corresponding to the desired goal, connected by a branching arrangement to at least one descendent node thereof corresponding to one of said criteria, the tree structure including a plurality of peer, antecedent and descendent relationships defined by the branching arrangement among the various nodes thereof,
(b) selecting a particular node as a central node for the report,
(c) providing complete data in association with said selected central node,
(d) providing complete data in association with descendent nodes of said selected central node,
(e) providing skeletal data, less than the complete data of said selected central node and said descendent nodes thereof in association with other nodes of the tree structure, and
(f) generating said output report to display a subset of said nodes and said branching arrangement of said tree structure, and to display complete data in association with said central node and said descendent nodes thereof and skeletal data in association with the other nodes of said tree structure, whereby the report is generated with a tree structure in a skeletal form.

18. A method as recited in claim 17 wherein said first and second providing steps comprise the further step of providing identifying data, branching data and relative value data associated with said central node and the descendent nodes of said central node.

19. A method as recited in claim 17 wherein said third providing step comprises the steps of:
selecting, as said other nodes of the tree structure, peer nodes of said central node, antecedent nodes of said central node, and peer nodes of said selected antecedent nodes.

20. A method as recited in claim 19 wherein said third providing step comprises the step of providing only said branching data in association with said other nodes of the tree structure.

21. A method as recited in claim 17 wherein said second generating step comprises the step of displaying a transient output display of said skeletal tree structure on an output display means of said programmed computer.

22. A method as recited in claim 17 wherein said second generating step comprises the step of outputting a report, including said skeletal tree structure, to an output record medium.

23. A method as recited in claim 22 wherein said outputting step comprises the step of printing said report on a print carrying medium.

24. Apparatus for displaying information in a tree structure comprising an input means, a display means, and a control means connected to said input means and to said display means, said control means being programmed:
(a) for providing input data from said input means to said control means representative of information associated with a root of the tree structure forming a $0^{th}$ node level therein;
(b) for providing input data from said input means to said control means representative of nodes on a $K^{th}$ level in the tree structure;
(c) for receiving input data from said input means representative of a relationship between said nodes on said $K^{th}$ level and related nodes thereto on different levels K+L where L is a nonzero integer;
(d) for repeating steps (b) and (c) until information concerning all nodes for display on the $K^{th}$ level has been provided to said control means;
(e) for operating said control means to generate control data for controlling said display means to display the nodes of said $K^{th}$ level and to display connections representing branches of said tree structure between said nodes and the related nodes thereof on said different levels; and
(f) for displaying said nodes of said $K^{th}$ level and connections between said nodes and said related nodes.

25. A method as recited in claim 24 wherein said control means is further programmed for choosing said integer L to be a negative integer,
for receiving input data representative of a relationship between said nodes on said Kth level and antecedent nodes thereof, and
for displaying said nodes of said Kth level and connections between said nodes and said antecedent nodes thereof.

26. A method as recited in claim 24 wherein said control means is further programmed for choosing said integer L to be a positive integer,
for receiving input data representative of a relationship between said nodes on said Kth level and descendent nodes thereof, and
for displaying said nodes of said Kth level and connections between said nodes and said descendent nodes thereof.

* * * * *